(12) United States Patent
Amano et al.

(10) Patent No.: US 9,827,928 B2
(45) Date of Patent: Nov. 28, 2017

(54) VEHICLE AND ELECTRIC POWER SUPPLY DEVICE THEREOF

(71) Applicant: KAWASAKI JUKOGYO KABUSHIKI KAISHA, Kobe-shi, Hyogo (JP)

(72) Inventors: Hiroaki Amano, Nishinomiya (JP); Takuya Sakamoto, Akashi (JP); Tadashi Miura, Akashi (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 248 days.

(21) Appl. No.: 14/684,221

(22) Filed: Apr. 10, 2015

(65) Prior Publication Data

US 2015/0298628 A1 Oct. 22, 2015

(30) Foreign Application Priority Data

Apr. 17, 2014 (JP) ................... 2014-085234

(51) Int. Cl.
| | |
|---|---|
| *B60L 1/00* | (2006.01) |
| *B60R 16/03* | (2006.01) |
| *B62J 6/00* | (2006.01) |
| *B60Q 1/00* | (2006.01) |
| *B60Q 1/46* | (2006.01) |

(52) U.S. Cl.
CPC ............ *B60R 16/03* (2013.01); *B60Q 1/0088* (2013.01); *B60Q 1/46* (2013.01); *B62J 6/001* (2013.01)

(58) Field of Classification Search
CPC ........ B60R 16/03; B60Q 1/0088; B60Q 1/46; B62J 6/001
USPC ........... 307/9.1, 10.1, 10.2, 10.3, 10.4, 10.5, 307/10.6, 10.7, 10.8, 328; 315/77–84; 340/425.5, 427
See application file for complete search history.

(56) References Cited

FOREIGN PATENT DOCUMENTS

| | | | | |
|---|---|---|---|---|
| DE | 2604398 A1 | * | 8/1977 | ............... B60Q 1/52 |
| JP | 09263180 A | | 10/1997 | |

OTHER PUBLICATIONS

European Patent Office, Extended European Search Report Issued in Application No. 15163821.0, dated Sep. 7, 2015, Germany, 8 pages.

* cited by examiner

*Primary Examiner* — Thomas Skibinski
(74) *Attorney, Agent, or Firm* — Alleman Hall Creasman & Tuttle LLP

(57) ABSTRACT

A vehicle comprises first and second operation units operated to perform switching between an electric power supply state and an electric power cut-off state of respective first and second electric components and a retaining device which starts electric power supply to the second electric component in response to the operation of the first and operation units to form the first and second electric power supply states, and retains the electric power supply to the second electric component, until the second operation unit is operated to form the second electric power cut-off state, despite a rider's operation of the first operation unit to form the first electric power cut-off state, after the retaining device started the electric power supply to the second electric component.

9 Claims, 5 Drawing Sheets

VEHICLE AND ELECTRIC POWER SUPPLY DEVICE THEREOF

BACKGROUND OF THE INVENTION

Field of the Invention

The present invention relates to a vehicle and an electric power supply device thereof.

Description of the Related Art

In some cases, a rider wishes to activate a specified accessory load after the rider stops a vehicle and turns OFF an ignition switch. In this case, typically, the accessory load is turned ON by using a switch which is different from the ignition switch and is directly connected to an electric power supply. As another example, Japanese Laid-Open Patent Application Publication No. Hei. 9-263180 discloses a device which activates a hazard lamp for a specified time after a rider stops a vehicle and turns OFF an ignition switch. This allows the rider to notify a subsequent vehicle that the rider is stopping the vehicle and getting off the vehicle, by blinking a hazard lamp for the specified time from the time point when the rider turns OFF the ignition switch and gets off the vehicle.

However, when the accessory load can be turned ON/OFF by using the switch which is different from the ignition switch and is directly connected to the electric power supply, a third party may mischievously turn ON the accessory load without the rider's permission, and as a result, the electric power may be wasted, unless the switch is configured to be locked. In the device disclosed in the above Patent Literature, a timer mechanism for measuring the specified time is built into a controller, and a voltage is applied to a turn signal relay to blink the hazard lamp for the specified time. The hazard lamp is automatically turned OFF after passage of the specified time. A user cannot choose the timing when the hazard lamp is turned OFF.

SUMMARY OF THE INVENTION

The present invention addresses the above-mentioned conditions, and an object of the present invention is to provide a configuration which allows a user to activate a second electric component which can be used in a stopped state of a vehicle after electric power supply to a first electric component used for driving is cut-off, and to choose a timing when the second electric component is turned OFF, while preventing a third party's mischief.

According to an aspect of the present invention, there is provided a vehicle comprising: a first operation unit which is operated by a rider to perform switching between a first electric power supply state in which an electric power is supplied to a first electric component used for driving of the vehicle and a first electric power cut-off state in which the electric power is not supplied to the first electric component; a second operation unit which is operated by the rider to perform switching between a second electric power supply state in which the electric power is supplied to a second electric component which can be used in at least a stopped state of the vehicle and a second electric power cut-off state in which the electric power is not supplied to the second electric component; and a retaining device which starts electric power supply to the second electric component in response to a command output by operating the first operation unit to form the first electric power supply state and a command output by operating the second operation unit to form the second electric power supply state, and retains the electric power supply to the second electric component, until the second operation unit is operated to form the second electric power cut-off state, despite the rider's operation of the first operation unit to form the first electric power cut-off state, after the retaining device has started the electric power supply to the second electric component.

In accordance with this configuration, after the electric power supply to the second electric component is started, the electric power supply to the second electric component can be retained (maintained), even when the first operation unit is operated to shift from the first electric power supply state to the first electric power cut-off state. To start the electric power supply to the second electric component, the rider is required to operate both of the first operation unit and the second operation unit to form the second electric power supply state. The first operation unit corresponding to the first electric component used for driving is set such that a third party who is someone other than the rider cannot operate the first operation unit in most cases. This makes it possible to prevent a situation in which the third party other than the rider who cannot operate the first operation unit mischievously starts the electric power supply to the second electric component. In addition, by operating the second operation unit to form the second electric power cut-off state after the rider operates the first operation unit to form the first electric power cut-off state, in the state in which the electric power supply to the second electric component is retained, the rider can cease the electric power supply to the second electric component at a desired timing. Since the electric power supply to the second electric component can take place in the state in which the electric power supply to the first electric component is ceased by operating the first operation unit to form the first electric power cut-off state, unwanted electric power consumption can be lessened.

The first operation unit may be operated via a portable member owned by the rider.

In accordance with this configuration, the third party who is someone other than the rider has difficulty operating the first operation unit.

The retaining device may include an activation section which is operative in response to an activation command, and an opening/closing section which is activated by the activation section and connected in series with the second electric component, wherein the activation section may receive the activation command in either one of a first state in which the first operation unit is operated to form the first electric power supply state and a second state in which the activation section operates and the second operation unit is operated to form the second electric power supply state, and wherein the activation section may close the opening/closing section in response to the activation command, and may open the opening/closing section, in a state in which the activation command is not provided to the activation section.

In accordance with this configuration, since the retaining device including the activation section and the opening/closing section is provided, the electric power supply to the second electric component can be suitably retained (maintained), even when the first operation unit is operated to form the first electric power cut-off state after the electric power supply to the second electric component has started.

The vehicle may further comprise a first opening/closing unit which is opened or closed by the first operation unit; and a second opening/closing unit which is opened or closed by the second operation unit and connected in parallel with the first opening/closing unit, wherein the activation section may operate in response to the activation command which is the first electric power supply state formed by closing the first opening/closing unit and the second electric power supply state formed by closing the opening/closing section and the second opening/closing unit.

In accordance with this configuration, the electric power supply to the second electric component can be suitably retained, even when the first operation unit is operated to form the first electric power cut-off state after the electric power supply to the second electric component has started.

The first opening/closing unit may be connected in series with the first electric component, the second opening/closing unit may be connected in series with the second electric component, and the first opening/closing unit and the second opening/closing unit may be connected in parallel in an electric circuit via which the electric power is supplied from an electric power supply unit to the first electric component and the second electric component.

In accordance with this configuration, since the electric power for activating the electric components can be utilized as a command for activating the retaining device, the configuration can be made simple.

The activation section may be an electromagnetic coil connected in series with the first opening/closing unit, the opening/closing section may be a contact element which is connected in series with the second opening/closing unit and shifted from an open state to a closed state by excitation of the electromagnetic coil, the retaining device may further include a connection line electrically connecting to each other a first wire on which the electromagnetic coil is provided and a second wire on which the contact element is provided, the electromagnetic coil may be excited in response to the activation command which is a current supplied to the electromagnetic coil through the connection line, the connection line may electrically connect to each other a high potential position of the first wire in which electric potential is higher than that in a position of the first wire on which the electromagnetic coil is provided and a low potential position of the second wire in which the electric potential is lower than that in a position of the second wire on which the contact element is provided and a position of the second wire on which the second opening/closing unit is provided, and the contact element may move to an electric power supply position in a state in which the electromagnetic coil is excited and move to an electric power cut-off position in a state in which the electromagnetic coil is unexcited.

In accordance with this configuration, even when the first operation unit is operated to form the first electric power cut-off state in a state in which the second electric power supply state is formed by operating the second operation unit, a state in which a current flows to the electromagnetic coil of the retaining device via the connection line is maintained. Therefore, even when the first operation unit is operated to form the first electric power cut-off state, the contact element of the retaining device is kept in an electric power supply position, which allows the continued use of the second electric component. When the second operation unit is operated to form the second electric power cut-off state in a state in which a current flows to the electromagnetic coil of the retaining device via the connection line, the electric power supply to the second electric component is ceased, and the current flowing from the connection line to the electromagnetic coil is cut-off. Therefore, no electric power is supplied to the second electric component even when the second operation unit is operated to form the second electric power supply state, unless the first operation unit is operated to form the first electric power supply state. Therefore, in the state in which the first electric power cut-off state is formed by operating the first operation unit, even if the second operation unit is operated to form the second electric power supply state, after the second operation unit is operated to form the second electric power cut-off state, no electric power is supplied to the second electric component, and as a result, the third party's mischief can be prevented.

The vehicle may further comprise a first diode which prevents a current from flowing through the first wire in a direction from the high potential position toward the first opening/closing unit, and a second diode which prevents the current from flowing through the connection line in a direction from the first wire toward the second wire.

In accordance with this configuration, the retaining device can operate stably with a simple configuration.

The vehicle may further comprise a first terminal connected in series with the first opening/closing unit, and a second terminal connected in parallel with the first opening/closing unit, wherein a circuit including the second electric component, the retaining device, and the second opening/closing unit may be provided on a harness module which is removably electrically connected to the first terminal and the second terminal.

In accordance with this configuration, the second electric component, the retaining device, and the second opening/closing unit, as a single harness module, can be easily removably mounted to a vehicle body.

The vehicle may further comprise a third operation unit which is operated by the rider to perform switching between a third electric power supply state in which the electric power is supplied to a third electric component which can be used in at least the stopped state of the vehicle and a third electric power cut-off state in which the electric power is not supplied to the third electric component; and a third opening/closing unit which is opened or closed by the third operation unit and connected in parallel with the second opening/closing unit in a position in which the electric potential is lower than that in the retaining device, wherein the vehicle may be configured such that the activation command is not provided to the activation section in a state in which the first opening/closing unit and the second opening/closing unit are opened.

In accordance with this configuration, in the state in which the second electric component continues to be used, after the second operation unit is operated to form the second electric power supply state and then the first operation unit is operated to form the first electric power cut-off state, the electric power supply to the third electric component can be started or ceased as desired by operating the third operation unit. On the other hand, in the state in which the second electric power cut-off state is formed by operating the second operation unit, the electric power supply to the third electric component remains ceased, even when the third operation unit is operated to form the third electric power supply state. In other words, in the state in which the first electric power cut-off state is formed by operating the first operation unit, whether or not to perform the electric power supply to the third electric component depends on the state of the second operation unit. In this way, a subordinate-to-superior relationship between the second operation unit and the third operation unit can be set with a simple configuration.

The vehicle may be a straddle-type vehicle.

In accordance with this configuration, in the straddle-type vehicle in which the operation units operated by the rider are exposed outside, it becomes possible to more effectively prevent a situation in which the third party mischievously operates the second operation unit to use the second electric component without permission.

According to another aspect of the present invention, there is provided an electric power supply device of a vehicle, the electric power supply device including a first operation unit which is operated by a rider to perform switching between a first electric power supply state in which an electric power is supplied to a first electric component used for driving of the vehicle and a first electric power cut-off state in which the electric power is not supplied to the first electric component, the electric power supply device comprising: a second operation unit which is operated by the rider to perform switching between a second electric power supply state in which the electric power is supplied to a second electric component which can be used in at least a stopped state of the vehicle and a second electric power cut-off state in which the electric power is not supplied to the second electric component; and a retaining device which starts electric power supply to the second electric component in response to a command output by operating the first operation unit to form the first electric power supply state and a command output by operating the second operation unit to form the second electric power supply state, and retains the electric power supply to the second electric component, until the second operation unit is operated to form the second electric power cut-off state, despite the rider's operation of the first operation unit to form the first electric power cut-off state, after the retaining device started the electric power supply to the second electric component.

DETAILED DESCRIPTION OF THE EMBODIMENTS

Hereinafter, the embodiments of the present invention will be described with reference to the drawings.

(Embodiment 1)

Figure 1:
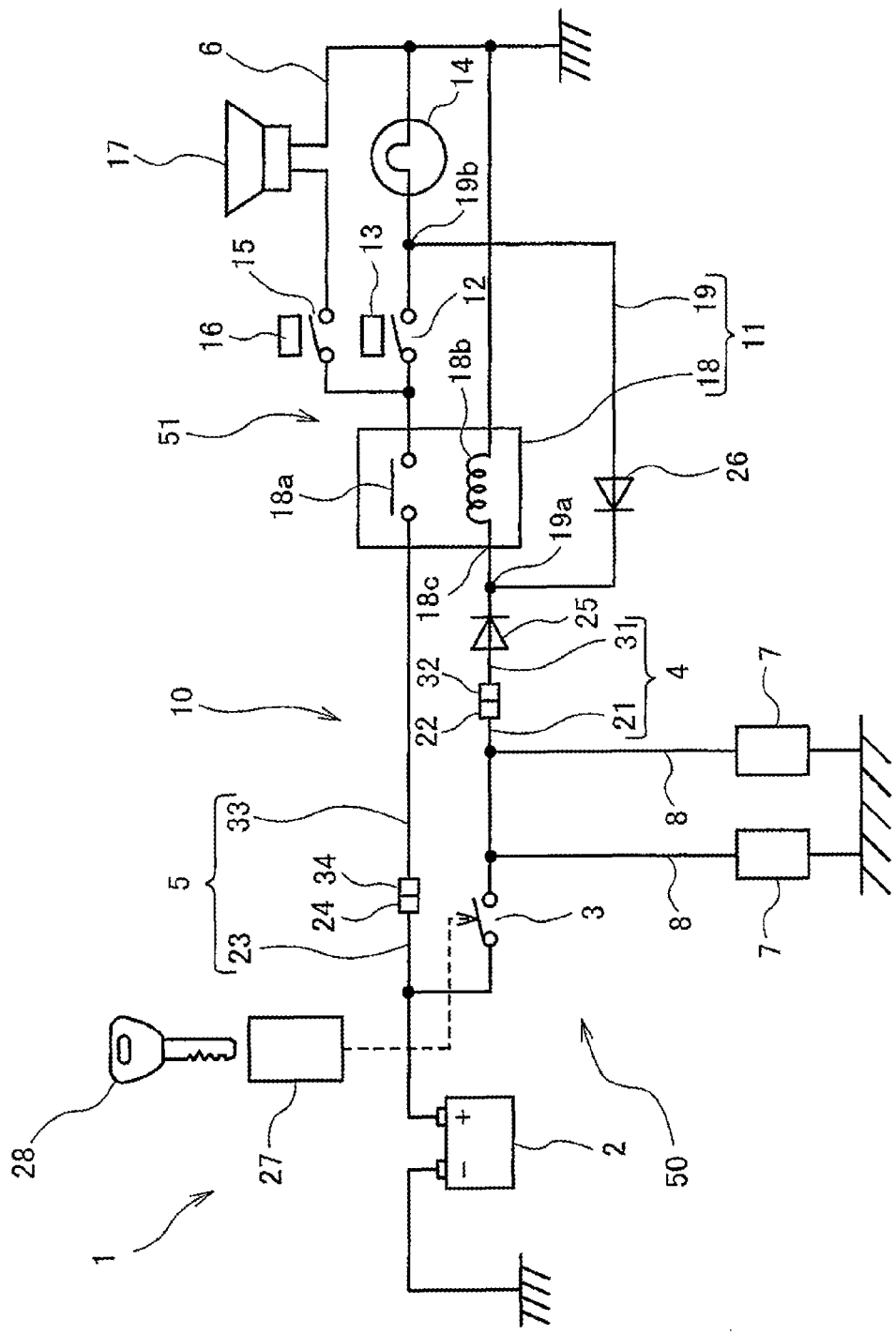
FIG. 1 is a circuit diagram showing the configuration of an electric power supply device of a vehicle according to Embodiment 1.

FIG. 1 is a circuit diagram showing the configuration of an electric power supply device 10 of a vehicle 1 according to Embodiment 1. The electric power supply device 10 is suitably applied to an open-ride-type vehicle in which at least one of a roof and a door is not provided and thereby operation units operated by a rider are exposed outside. Open-ride-type vehicles include a straddle-type vehicle, an ATV (all-terrain vehicle), an open car, a buggy car, a ship (boat), etc. Straddle-type vehicles include a motorcycle, an automated three-wheeled vehicle, a bicycle (bike), a personal watercraft (PWC), etc. Hereinafter, a case where the vehicle 1 is a motorcycle activated to drive on a road by an internal combustion engine will be exemplarily described.

As shown in FIG. 1, the electric power supply device 10 includes a first wire 4 which is a power line connecting the positive electrode of an electric power supply unit 2 (e.g., battery) to a grounding location, a second wire 5 which is a power line connected in parallel with the first wire 4 and connecting the positive electrode of the electric power supply unit 2 to a grounding location, and a third wire 6 which is a power line connected in parallel with a portion of the second wire 5. The first wire 4 is provided with a first opening/closing unit 3 which is opened or closed by a first operation unit 27 which is operated via a portable member 28 owned by the rider. For example, the first opening/closing unit 3 is opened or closed mechanically in response to the movement of the first operation unit 27 operated by the rider. In the present embodiment, for example, the first operation unit 27 is a key cylinder, the portable member 28 is a key, and the first opening/closing unit 3 is an ignition switch (main switch). The key which is the portable member 28 is inserted into a key cylinder 27 of the vehicle 1, which is exposed outside, and then rotated, and thereby the first opening/closing unit 3 is closed.

The first wire 4 includes a high potential power line 21 and a low potential power line 31 connected in series with the high potential power line 21. A terminal 22 of the high potential power line 21 and a terminal 32 of the low potential power line 31 are removably connected to each other. The first opening/closing unit 3 is provided on the high potential power line 21 in a position in which electric potential is higher than that in the terminal 22.

At least one fourth wire 8 branches from the first wire 4 in a position in which the electric potential is lower than that in the first opening/closing unit 3 and is connected to a grounding location. The fourth wire 8 is provided with at least one first electric component 7 (electric component used for driving) used for driving of the vehicle 1. The fourth wire 8 branches from the first wire 4 in the position in which the electric potential is higher than those in the terminals 22, 32. The first opening/closing unit 3 is connected in series with the first electric component 7 and connected in parallel with the terminal 22 of the high potential power line 21. The examples of the first electric component 7 are a vehicle controller, an ignition plug, an injector, an engine sensor, a driving actuator, a driving relay, a regulator, etc. The first electric component 7 may include security components required for driving, such as a brake lamp, a direction indicator, a head light, a buzzer, a gauge, etc., as well as the electric components used for activating the engine. Or, the first electric component 7 may include a driving assist device such as a brake control device such as ABS (anti-braking system), or an electronically-controlled suspension.

The second wire 5 includes a high potential power line 23, and a low potential power line 33 which is connected in series with the high potential power line 23 in a position in which the electric potential is lower. The high potential power line 23 and the low potential power line 33 are removably connected to each other in such a manner that a terminal 34 of the low potential power line 33 is removably connected to a terminal 24 of the high potential power line 23.

The second wire 5 is connected to the electric power supply unit 2 while bypassing the first opening/closing unit 3. The second wire 5 branches from the first wire 4 in a position in which the electric potential is higher than that in the first opening/closing unit 3 and is connected to the grounding location. The second wire 5 is provided with a second electric component 14 (electric component used in non-driving state) which can be used in at least a stopped state of the vehicle 1. The second electric component 14 is, for example, an accessory load and the like, and includes lamps (e.g., alarm lamp, hazard lamp, head lamp, etc.), a speaker, an accessory electric power supply, an audio device, a navigation device, a heater, etc. The vehicle 1 can drive on the road in a state in which the second electric component 14 is not supplied with the electric power and deactivated. In other words, the rider may wish to use the second electric component 14 in the stopped state of the vehicle 1. The second electric component 14 may be an electric component which is externally removably attached to the vehicle body of the vehicle 1. In that case, the second wire 5 is provided with a connector, a socket, a plug, and the like which allow the electric power to be supplied to the electric component which is externally removably attached to the vehicle body. In the present embodiment, for example, the second electric component 14 is an auxiliary lamp.

The second wire 5 is provided with a second opening/closing unit 12. The second opening/closing unit 12 is connected in parallel with the first opening/closing unit 3 and connected in series with the second electric component 14. The second opening/closing unit 12 is opened or closed (turned OFF or ON) by a second operation unit 13 operated by the rider. For example, the second opening/closing unit 12 is opened or closed mechanically in response to the movement of the second operation unit 13 operated by the rider. For example, a switch such as a button may be used as the second operation unit 13.

The first wire 4 and the second wire 5 are provided with a retaining device 11 which retains (maintains) the electric power supply to the second wire 5 for a predetermined desired period. Specifically, the retaining device 11 is provided on the low potential power lines 31, 33 of the first and second wires 4, 5. In the present embodiment, the retaining device 11 includes a relay device 18. The relay device 18 includes an electromagnetic coil 18b connected in series with the first opening/closing unit 3, a contact element 18a which is connected in series with the second opening/closing unit 12 and the second electric component 14 and shifts from an open state to a closed state by excitation of the electromagnetic coil 18b, and a relay terminal 18c electrically connected to the electromagnetic coil 18b. The retaining device 11 further includes a connection line 19 electrically connecting to each other the first wire 4 provided with the electromagnetic coil 18b and the second wire 5 provided with the contact element 18a. The connection line 19 electrically connects a high potential position 19a of the first wire 4 in which the electric potential is lower than that in the first opening/closing unit 3 and is higher than that in a position of the first wire 4 on which the electromagnetic coil 18b is provided, and a low potential position 19b of the second wire 5 in which the electric potential is lower than that in a position of the second wire 5 on which the contact element 18a is provided and that in a position of the second wire 5 on which the second opening/closing unit 12 is provided.

In other words, the relay terminal 18c serves as a receiver section which receives a current flowing to the relay terminal 18c through the connection line 19, as an activation command, and allows the electric power to be supplied to the electromagnetic coil 18b. The electromagnetic coil 18b serves as an activation section which is excited in response to the current received in the relay terminal 18c, as the activation command. The contact element 18a serves as an opening/closing section which is activated by the electromagnetic coil 18b. The electromagnetic coil 18b of the relay device 18 is excited in response to the activation commands which are an electric power supply state formed by closing the first opening/closing unit 3, and an electric power supply state formed by closing both of the contact element 18a and the second opening/closing unit 12. The contact element 18a is activated to move to an electric power supply position in the state in which the electromagnetic coil 18b is excited and to an electric power cut-off position in the state in which the electromagnetic coil 18b is unexcited.

The first wire 4 is provided with a first diode 25 in a position in which the electric potential is higher than that in the connecting point of the first wire 4 and the connection line 19 and lower than that in a position on which the first opening/closing unit 3 is provided, and permits a current to flow only in a direction from the first opening/closing unit 3 toward the electromagnetic coil 18b. The first diode 25 serves to prevent a current from flowing from the connection line 19 toward the first opening/closing unit 3. The connection line 19 is provided with a second diode 26 which permits a current to flow only in a direction from the second wire 5 toward the first wire 4. The second diode 26 serves to prevent a current from flowing through the connection line 19 in a direction from the first wire 4 toward the second wire 5.

The low potential power line 31 of the first wire 4 is provided with the first diode 25 and the electromagnetic coil 18b. The low potential power line 33 of the second wire 5 is provided with the contact element 18a, the second opening/closing unit 12, and the second electric component 14. The connection line 19 connects to each other the low potential power line 33 of the second wire 5 and the low potential power line 31 of the first wire 4.

The high potential power lines 21, 23 of the first and second wires 4, 5 constitute a first harness module 50, while the low potential power lines 31, 33 of the first and second wires 4, 5 constitute a second harness module 51. The second harness module 51 is provided with a circuit including the retaining device 11, the second opening/closing unit 12, the first diode 25 and the second diode 26. The second harness module 51 includes a ground terminal which is grounded to a vehicle body frame. The first harness module 50 and the second harness module 51 are removably coupled to each other by the terminals 22, 24, 32, and 34. The second operation unit 13 and a wire connected to the second operation unit 13 are preferably unitarily connected to the second harness module 51. This makes it possible to easily additionally removably mount a system associated with the second harness module 51 to the vehicle body, according to the rider's preference.

The third wire 6 is connected in parallel with a portion of the low potential power line 33 of the second wire 5 and connected to the electric power supply unit 2 while bypassing the first opening/closing unit 3. Specifically, the third wire 6 is connected to the second wire 5 in a position which is between the contact element 18a and the second opening/closing unit 12 and in a position in which the electric potential is lower than that in a position on which the second electric component 14 is provided. The third wire 6 is included in the second harness module 51. The third wire 6 is provided with a third electric component 17 (electric component used in a non-driving state) which can be used in at least the stopped state of the vehicle 1.

The third electric component 17 is, for example, an accessory load and the like, and includes lamps (e.g., alarm lamp, hazard lamp, head lamp, etc.), a speaker, an accessory electric power supply, an audio device, a navigation device, a heater, etc. The vehicle 1 can drive on the road in a state in which the third electric component 17 is not supplied with the electric power and deactivated. In other words, the rider may wish to use the third electric component 17 in the stopped state of the vehicle 1. In the present embodiment, for example, the third electric component 17 is a speaker.

The third wire 6 is provided with a third opening/closing unit 15. The third opening/closing unit 15 is connected in parallel with the first opening/closing unit 3 and the second opening/closing unit 12, and connected in series with the third electric component 17. Specifically, in an electric circuit in which the electric power is supplied from the electric power supply unit 2 to the first to third electric components 7, 14, 17, the first to third opening/closing units 3, 12, 15 are connected in parallel. The third opening/closing unit 15 is opened or closed by a third operation unit 16 operated by the rider. For example, the third opening/closing unit 15 is opened or closed mechanically in response to the movement of the third operation unit 16 operated by the rider.

The negative terminal of the electric power supply unit 2 is connected to a grounding location, while the low potential end portions of the first to fourth wires 4, 5, 6, 8 are connected to locations in which the electric potential is equal to that in the grounding location. In the present embodiment, the electric potential of the vehicle body frame is set to a ground potential, and the low potential end portions of the first to fourth wires 4, 5, 6, 8 are connected to the vehicle body frame.

Next, the operation of the electric power supply device 10 will be described.

Figure 2:
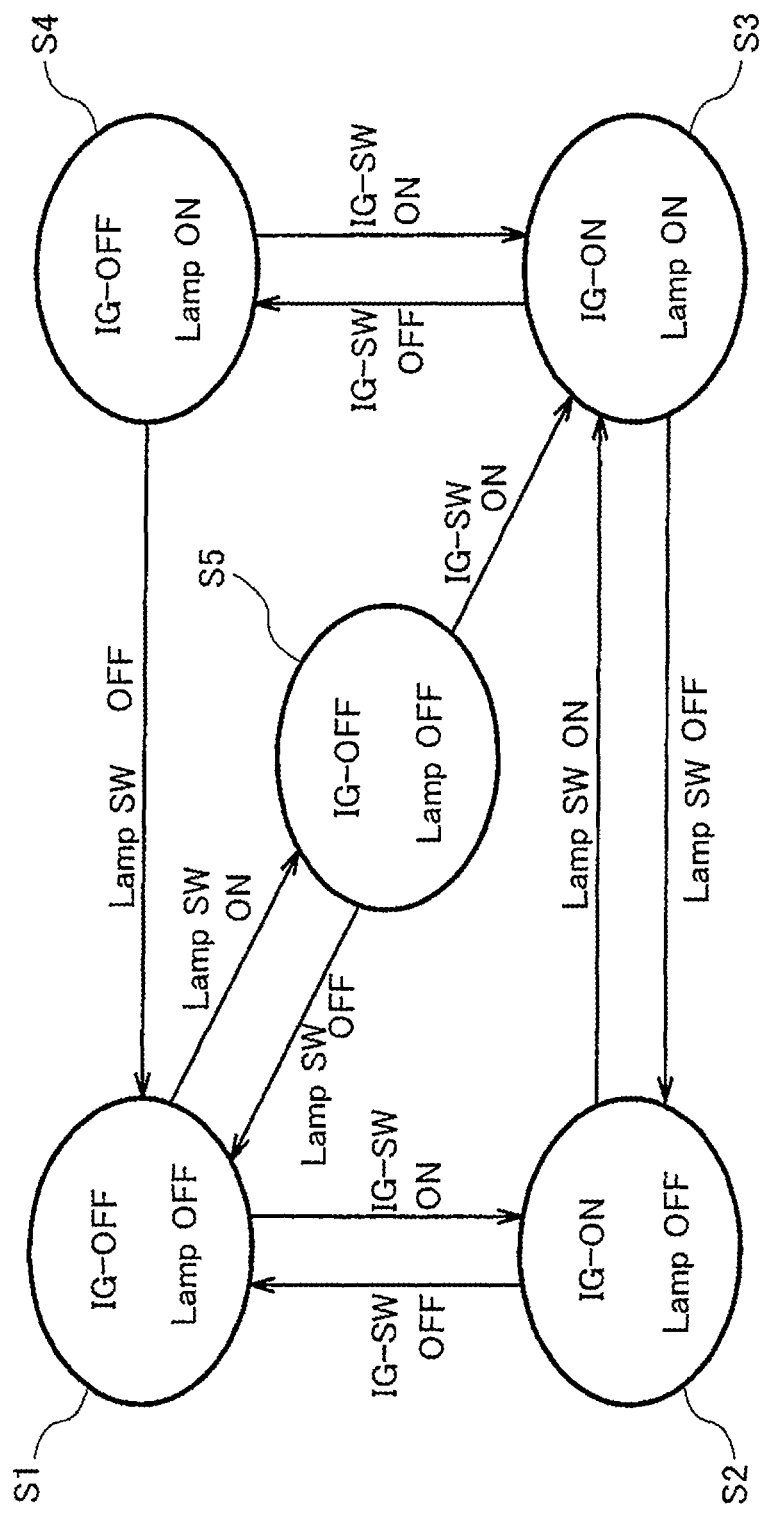
FIG. 2 is an operation transition diagram showing the operation of the electric power supply device of FIG. 1.

FIG. 2 is an operation transition diagram showing the operation of the electric power supply device 10 of FIG. 1. In the example of FIG. 2, "IG" indicates the first opening/closing unit 3, "lamp" indicates the second electric component 14, and "lamp SW" indicates the second opening/closing unit 12. As shown in FIGS. 1 and 2, in the state in which both of the first and second opening/closing units 3, 12 are opened (S1), the rider operates the first operation unit 27 by using the portable member 28 to form the electric power supply state. Thereby, the first opening/closing unit 3 is closed and the electric power supply to the first electric component 7 is started (S2). At this time, the contact element 18a is closed by the excitation of the electromagnetic coil 18b, but the second opening/closing unit 12 is opened. Therefore, the second electric component 14 remains in the electric power cut-off state (lamp OFF).

Then, the rider operates the second operation unit 13 to form the electric power supply state, while maintaining the state in which the first opening/closing unit 3 is closed, and as a result, electric power supply to the second electric component 14 is started (lamp ON) (S3). Specifically, the lamp 14 is ON in the state in which the vehicle 1 can drive. At this time, the contact element 18a and the second opening/closing unit 12 are closed, and therefore a current which has flowed through the second wire 5 and the connection line 19 is supplied to the electromagnetic coil 18b. Then, the rider operates the first operation unit 27 by using the portable member 28 to form the electric power cut-off state, while maintaining the state in which the second opening/closing unit 12 is closed, and thereby the first opening/closing unit 3 is opened to cease the electric power supply to the first electric component 7 (S4). At this time, a current is supplied from the electric power supply unit 2 to the electromagnetic coil 18b via the second wire 5 and the connection line 19. Therefore, the contact element 18a is maintained in the closed state and the electric power supply to the second electric component 14 is retained (maintained) (lamp ON). In other words, even after the rider operates the first operation unit 27 by using the portable member 28 to form the electric power cut-off state and takes away the portable member 28 from the vehicle 1, the electric power supply to the second electric component 14 can be continued. In the present embodiment, the vehicle 1 is locked so that the vehicle 1 cannot start to drive, when the key as the portable member 28 is pulled out from the key cylinder as the first operation unit 27 (e.g., handle is locked).

Then, the rider operates the second operation unit 13 to form the electric power cut-off state, while maintaining the state in which the first opening/closing unit 3 is opened, and thereby the electric power supply to the second electric component 14 is ceased (S1). At this time, since the second opening/closing unit 12 is opened, no current flows through the second wire 5. Therefore, a current which was supplied to the electromagnetic coil 18b via the connection line 19 is ceased, and the contact element 18a is opened. Therefore, the state in which both of the first opening/closing unit 3 and the second opening/closing unit 12 are opened is formed again. In this state (S1), even when the second operation unit 13 is operated to close the second opening/closing unit 12 so that the electric power supply state is formed, no current is supplied to the second electric component 14 (S5). In other words, after the rider operates the second operation unit 13 to open the second opening/closing unit 12 so that the electric power cut-off state is formed, in the state in which the first opening/closing unit 3 is opened, the state in which the second electric component 14 is supplied with the electric power cannot be formed, if the rider operates only the second operation unit 13 to close the second opening/closing unit 12 so that the electric power supply state is formed. To resume the electric power supply to the second electric component 14, the rider is required to operate the first operation unit 27 by using the portable member 28 to close the first opening/closing unit 3 so that the electric power supply state is formed (S2), and to operate the second operation unit 13 to close the second opening/closing unit 12 so that the electric power supply state is formed (S3).

In accordance with the above configuration, after the electric power supply to the second electric component 14 was started, the electric power supply to the second electric component 14 can be retained, even when the first operation unit 27 is operated to shift from the electric power supply state to the electric power cut-off state. In addition, to start the electric power supply to the second electric component 14, the rider is required to operate both of the first operation unit 27 and the second operation unit 13 to form the electric power supply state. Typically, the first operation unit 27 for the first electric component 7 used for driving cannot be operated by a third party who is someone other than the rider. This makes it possible to prevent a situation in which the third party who is someone other than the rider and is not permitted to operate the first operation unit 27 mischievously starts the electric power supply to the second electric component 14. After the rider operated the first operation unit 27 to form the electric power cut-off state, the electric power supply to the second electric component 14 can be ceased at a desired timing by the rider's operation of the second operation unit 13 to form the electric power cut-off state. The second electric component 14 can be supplied with the electric power in the state in which the electric power supply to the first electric component 7 is ceased as a result of the rider's operation of the first operation unit 27 to form the electric power cut-off state. This can suppress unwanted electric power consumption.

When the rider operates the second operation unit 13 to form the electric power cut-off state, in the state in which the first opening/closing unit 3 is opened and a current is supplied to the electromagnetic coil 18b via the connection line 19, the electric power supply to the second electric component 14 is ceased, and no current is supplied to the electromagnetic coil 18b through the connection line 19. Therefore, even when the rider operates the second operation unit 13 to form the electric power supply state, no current is supplied to the second electric component 14, unless the first operation unit 27 is operated to form the electric power supply state. Therefore, in the state in which the electric power cut-off state is formed as a result of the rider's operation of the first operation unit 27, even if the second operation unit 13 is operated to form the electric power supply state after the second operation unit 13 was operated to form the electric power cut-off state, no electric power is supplied to the second electric component 14. This makes it possible to easily prevent the third party's mischief.

The electric power supply device 10 is divided into the first harness module 50 and the second harness module 51 such that the first harness module 50 and the second harness module 51 are removably coupled to each other. The second harness module 51 includes the retaining device 11, the second opening/closing unit 12, the third opening/closing unit 15, the first diode 25 and the second diode 26. To provide the above described function, it is sufficient that only the second harness module 51 is changed with respect to the existing components. It is not necessary to change the first harness module 50, with respect to the existing components. Therefore, it becomes possible to easily incorporate the function into a vehicle of an existing kind.

Since the retaining device 11 is provided on the power line, the present configuration can be easily added without using special control. In addition, it is not necessary to adjust the output of the retaining device 11 on the power line, as compared to a case where the retaining device 11 is provided on a signal line. The retaining device 11 provided on the power line is less susceptible to a noise, and can be easily implemented.

The third wire 6 is not provided with a connection line which is electrically connected to the terminal 18c of the relay device 18 while bypassing the first opening/closing unit 3 or the second opening/closing unit 12. Specifically, in the state in which the first opening/closing unit 3 and the second opening/closing unit 12 are opened, the third wire 6 is electrically disconnected from the terminal 18c of the relay device 18. Because of this, in the state in which the second electric component 14 is not supplied with the electric power, the third electric component 17 cannot be placed in the electric power supply state even when the third opening/closing unit 15 is closed. On the other hand, in the state in which the second electric component 14 is supplied with the electric power, the third electric component 17 can be placed in the electric power supply state by closing the third opening/closing unit 15 or can be placed in the electric power cut-off state by opening the third opening/closing unit 15.

In other words, when the first operation unit 27 is operated to form the electric power cut-off state in the state in which the electric power supply state is formed by operating the second operation unit 13, and the second electric component 14 continues to be used, the third electric component 17 can be placed in the electric power supply state or the electric power cut-off state (turned ON or OFF), as desired, by operating the third operation unit 16. On the other hand, in the state in which the electric power cut-off state is formed by operating the second operation unit 13, the electric power supply to the third electric component 17 remains ceased, even when the third operation unit 16 is operated to form the electric power supply state. In brief, in the state in which the first operation unit 27 is operated to form the electric power cut-off state, whether or not the third electric component 17 can be supplied with electric power, depends on the operation of the second operation unit 13. Therefore, in this way, a subordinate-to-superior relationship between the second operation unit 13 and the third operation unit 16 can be set with a simple configuration.

A lock operation for inhibiting the vehicle body from driving, such as handle locking, may be performed in response to the operation of the first operation unit 27. This makes it possible to easily prevent a situation in which the third party mischievously moves the vehicle body, while activating the second electric component 14.

(Embodiment 2)

Figure 3:
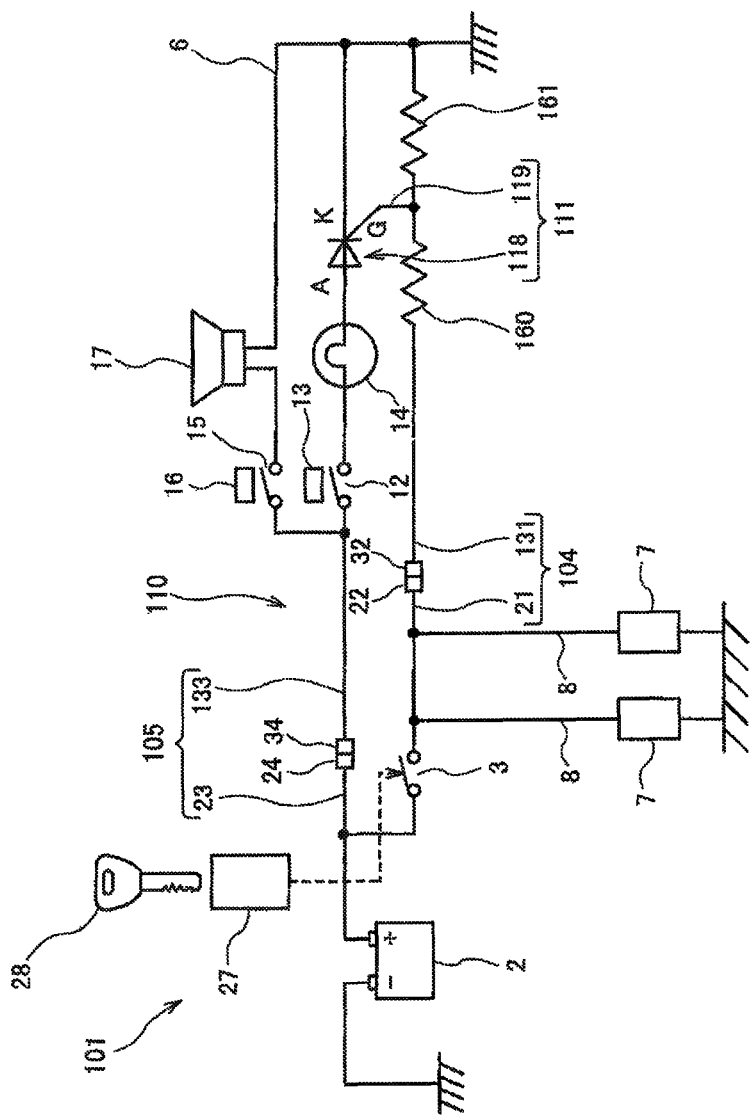
FIG. 3 is a circuit diagram showing the configuration of an electric power supply device of a vehicle according to Embodiment 2.

FIG. 3 is a circuit diagram showing the configuration of an electric power supply device 110 of a vehicle 101 according to Embodiment 2. In Embodiment 2, the same components as those of Embodiment 1 are designated by the same reference symbols, and will not be described repeatedly. As exemplarily shown in FIG. 3, in Embodiment 2, a thyristor 118 is used instead of the relay device 18 of Embodiment 1. The thyristor 118 is provided on a low potential power line 133 of a second wire 105. The thyristor 118 is placed in such a manner that its anode is connected to the second wire 105 in a position in which the electric potential is higher and its cathode is connected to the second wire 105 in a position in which the electric potential is lower. A low potential power line 131 of the first wire 104 is provided between two bias resistors 160, 161 which are connected in series. A portion of the first wire 104 which is between the bias resistors 160, 161, is connected to the gate of the thyristor 118 via a connection line 119. In brief, the thyristor 118 and the connection line 119 constitute a retaining device 111.

The gate of the thyristor 118 serves as an activation section which is operative in response to a voltage applied thereto as an activation command. A portion of the thyristor 118 which is between the anode and cathode serves as an opening/closing section which is placed in a continuity state in which a current flows therethrough, when a voltage is applied to the gate. The portion of the thyristor 118 which is between the anode and cathode is not placed in the continuity state unless a gate current flows therethrough. Once the portion of the thyristor 118 which is between the anode and cathode is placed in the continuity state, this state is not terminated even when the gate current is cut-off, and is retained until the flow of the current between the anode and the cathode is ceased.

Next, the operation of the electric power supply device 110 will be described. When the first opening/closing unit 3 is closed in the state in which all of the first to third opening/closing units 3, 12, 15 are opened, the electric power supply to the first electric component 7 is started. At this time, a voltage is applied to the gate of the thyristor 118. However, the second opening/closing unit 12 is opened and no forward bias is applied between the anode and the cathode of the thyristor 118. Therefore, the second electric component 14 remains in the electric power cut-off state. Then, the second opening/closing unit 12 is closed, and thereby the electric power supply to the second electric component 14 is started.

Then, the first opening/closing unit 3 is opened and the gate current is cut-off. In this state, a current is flowing between the anode and the cathode of the thyristor 118, so that the portion of the thyristor 118 between the anode and the cathode is maintained in the continuity state, and the electric power supply to the second electric component 14 is retained (maintained). Then, the second opening/closing unit 12 is opened. In this state, no forward bias is applied between the anode and the cathode of the thyristor 118, and the electric power supply to the second electric component 14 is ceased. Even when the second opening/closing unit 12 is closed again in this state, the first opening/closing unit 3 is opened and no voltage is applied to the gate of the thyristor 118, so that the electric power supply to the second electric component 14 is not resumed. To resume the electric power supply to the second electric component 14, the rider is required to operate the first operation unit 27 by using the portable member 28 to close the first opening/closing unit 3 so that the electric power supply state is formed.

In accordance with the above configuration, the retaining device 111 can be implemented as an electric switch rather than a physical switch in which the contact element moves by electromagnetic force. This can prevent an operation failure which is attributed to the movement of the contact element, and improve reliability. The other configuration is the same as that of Embodiment 1 and will not be described repeatedly.

(Embodiment 3)

Figure 4:
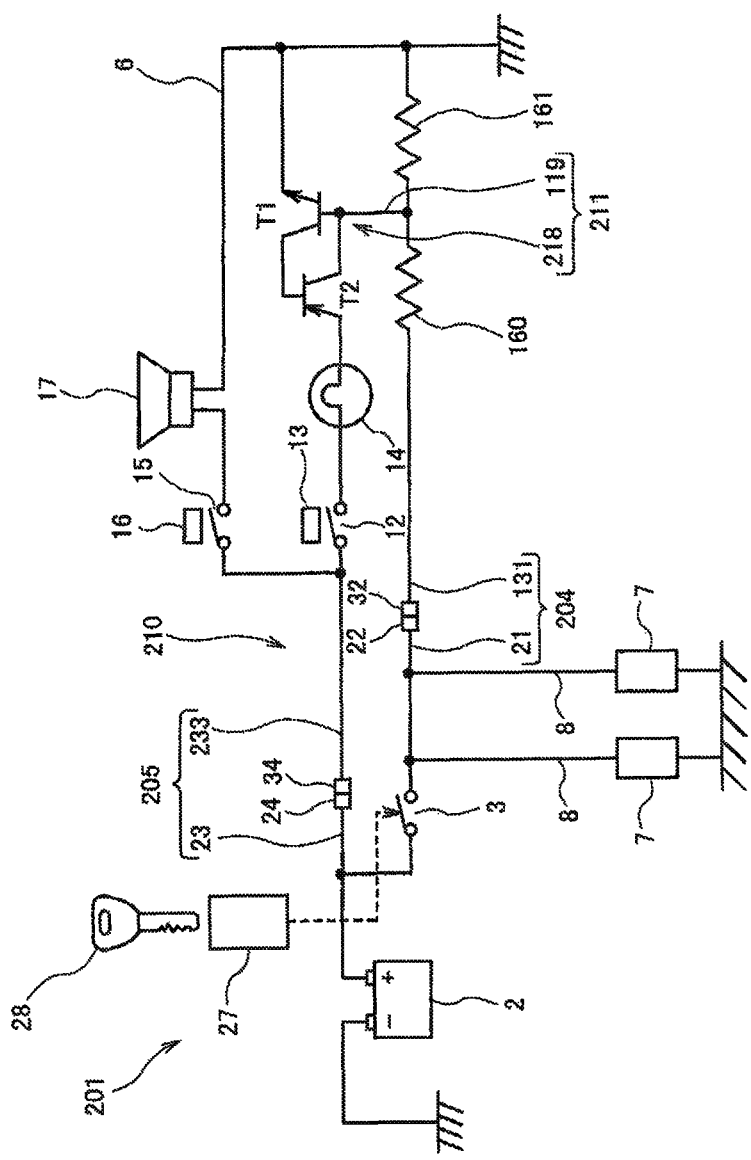
FIG. 4 is a circuit diagram showing the configuration of an electric power supply device of a vehicle according to Embodiment 3.

FIG. 4 is a circuit diagram showing the configuration of an electric power supply device 210 according to Embodiment 3. In Embodiment 3, the same components as those of Embodiment 1 are designated by the same reference numerals and will not be described repeatedly. As exemplarily shown in FIG. 4, in Embodiment 3, a transistor circuit 218 is used instead of the relay device 18 of Embodiment 1. The transistor circuit 218 is a circuit which is equivalent to the thyristor 118 of Embodiment 2, and is a combination of a NPN transistor T1 and a PNP transistor T2. The base of the NPN transistor T1 is connected to a first electric circuit 204 via a connection line 119. In brief, the transistor circuit 218 and the connection line 119 constitute a retaining device 211.

The emitter of the NPN transistor T1 is connected to a second electric circuit 205 in a position in which the electric potential is lower, while the collector of the NPN transistor T1 is connected to the base of the PNP transistor T2. The emitter of the PNP transistor T2 is connected to the second electric circuit 205 in a position in which the electric potential is higher, while the collector of the PNP transistor T2 is connected to the base of the NPN transistor T1.

The transistor circuit 218 is not placed in a continuity state unless a voltage is applied to the base of the NPN transistor T1. When both of the first opening/closing unit 3 and the second opening/closing unit 12 are closed, a base current flows through the NPN transistor T1, and thereby a collector current flows therethrough. The collector current of the NPN transistor T1 becomes the base current of the PNP transistor T2. Therefore, the collector current also flows through the PNP transistor T2. The collector current of the PNP transistor T2 becomes the base current of the NPN transistor T1 and therefore increases the collector current of NPN transistor T1. In this way, the NPN transistor T1 and the PNP transistor T2 are kept in the continuity state, by mutual action. Therefore, once the transistor circuit 218 is placed in the continuity state, this state is retained even when a current supplied to the transistor circuit 218 through the connection line 119 is cut-off.

Next, the operation of the electric power supply device 210 will be described. When the first opening/closing unit 3 is closed in the state in which all of the first to third opening/closing units 3, 12, 15 are opened, the electric power supply to the first electric component 7 is started. At this time, a voltage is applied to the base of the NPN transistor T1, but the second opening/closing unit 12 is opened, and thereby the second electric component 14 remains in the electric power cut-off state. Then, the second opening/closing unit 12 is closed, and thereby the electric power supply to the second electric component 14 is started.

Then, the first opening/closing unit 3 is opened, and thereby a current supplied to the NPN transistor T1 through the connection line 119 is cut-off. In this state, the PNP transistor T2 remains in the continuity state and thereby the base current flows through the NPN transistor T1. Therefore, the transistor circuit 218 is retained in the continuity state and the electric power supply to the second electric component 14 is retained. Then, the second opening/closing unit 12 is opened, and thereby the electric power supply to the second electric component 14 is ceased. Even when the second opening/closing unit 12 is closed again in this state, the electric power supply to the second electric component 14 remains ceased, because the first opening/closing unit 3 is opened, and no voltage is applied to the gate of the NPN transistor T1. To resume the electric power supply to the second electric component 14, the rider is required to operate the first operation unit 27 by using the portable member 28 to close the first opening/closing unit 3 so that the electric power supply state is formed.

In accordance with the above configuration, the retaining device 211 can be implemented as an electric switch rather than a physical switch in which the contact element moves by electromagnetic force. This can prevent an operation failure which is attributed to a movement of the contact element, and improve reliability. The other configuration is the same as that of Embodiment 1 and will not be described repeatedly.

(Embodiment 4)

Figure 5:
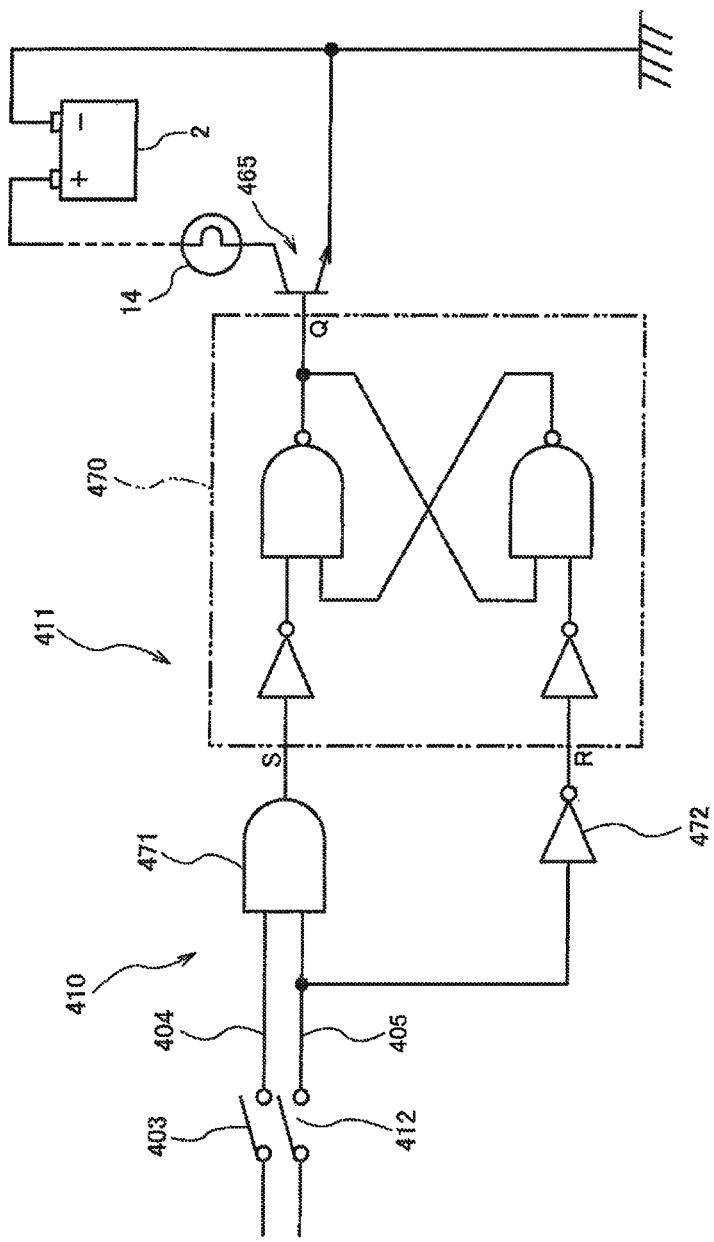
FIG. 5 is a circuit diagram showing the configuration of an electric power supply device of a vehicle according to Embodiment 4.

FIG. 5 is a circuit diagram showing the configuration of an electric power supply device 410 of a vehicle according to Embodiment 4. As exemplarily shown in FIG. 5, the electric power supply device 410 includes a first wire 404 provided with a first opening/closing unit 403 and a second wire 405 provided with a second opening/closing unit 412. The second opening/closing unit 412 is connected to the second electric component 14 via a retaining device 411. The retaining device 411 includes a RS-type flip flop circuit 470, an AND circuit 471, and a NOT circuit 472.

The first wire 404 and the second wire 405 are connected to the inputs of the AND circuit 471. The output of the AND circuit 471 is connected to the input S of the RS-type flip flop circuit 470. The second wire 405 is connected to the input of the NOT circuit 472. The output of the NOT circuit 472 is connected to the input R of the RS-type flip flop circuit 470. The output Q of the RS-type flip flop circuit 470 is connected to the base terminal of a transistor 465. The second electric component 14 is connected between the electric power supply unit 2 and the collector terminal of a transistor 465. When the transistor 465 is turned ON according to the output Q of the RS-type flip flop circuit 470, the second electric component 14 is placed in the electric power supply state.

Next, the operation of the electric power supply device 410 will be described. It is supposed that the state "0" of a logic circuit indicates a low voltage state and the state "1" of the logic circuit indicates a high voltage state. When both of the first opening/closing unit 403 and the second opening/closing unit 412 are closed, the input S becomes "1", the input R becomes "0", and thereby the output Q becomes "1", which allows the electric power supply to the second electric component 14 to be started. Then, the first opening/closing unit 403 is opened with the second opening/closing unit 412 closed. Thereby, the input S becomes "0", the input R becomes "0", and the output Q remains "1". In this state, the electric power supply to the second electric component 14 is retained (maintained). Then, the second opening/closing unit 412 is opened, and thereby the output Q becomes "0", which causes the electric power supply to the second electric component 14 to be ceased. In this state, even when the second opening/closing unit 412 is closed again, the first opening/closing unit 403 is opened, and thereby the input S remains "0" and the output Q remains "0". Therefore, the second electric component 14 remains in the electric power cut-off state. To resume the electric power supply to the second electric component 14, it is necessary to close the first opening/closing unit 403. The other configuration is the same as that of Embodiment 1 and will not be described repeatedly.

Although in Embodiment 4, the logic circuit is configured by the electric circuit including electric elements, the same operation as that of the logic circuit may be performed by executing a program stored in a controller. In this case, the controller may receive as inputs commands input by the rider's operation of the first and second operation units, and output a signal indicating whether or not to permit the electric power supply to the second electric component. By using the program in this way, particular electric elements may be omitted. In Embodiment 4, the controller (electric circuit) outputs an activation signal which is different from an activation electric power, electric power consumption in the determination as to the operation of the second electric component can be lessened.

The present invention is not limited to the above described embodiment, and its constituents may be changed, added, or deleted without departing from the spirit of the invention. The embodiments may be combined as desired. For example, a part of the constituents or a method in one embodiment may be applied to another embodiment. For example, in the case of a vehicle incorporating a keyless entry system, a transmitter which wirelessly transmits a signal including authentication information may be used as the portable member 28, and a starter operation unit (e.g., starter button) configured to close the first opening/closing unit 3 only when the operation of the starter operation unit satisfies a predetermined authentication condition, may be used as the first operation unit 27. Or, in a case where the vehicle is an electric vehicle or a hybrid vehicle including an electric motor as a driving power source for moving the vehicle body, a main switch which turns ON or OFF a main electric power supply of the vehicle may be used as the first opening/closing unit 3. In brief, the first opening/closing unit 3 may allow the stopped state of the vehicle to be retained, when the first operation unit 27 is operated to form the electric power cut-off state.

The first opening/closing unit may be an accessory switch or the like, instead of the main switch. A limit time may be set in a time period for which the electric power supply to the second electric component 14 is continued after the first opening/closing unit 3, 303, 403 is closed in the state in which the second opening/closing unit 12, 312, 412 is closed, and a protecting device which automatically ceases the electric power supply to the second electric component 14 even in the state in which the second opening/closing unit 12, 312, 412 is closed, may be used. Or, plural sets of an accessory load, an accessory opening/closing unit, and an inverse inhibiting diode may be prepared, the sets may be connected in parallel, and the electric power may be supplied only to a desired set. The first to third operation units 27, 13, 16 may be operated to mechanically move the first to third opening/closing units 3, 12, 15 so that the continuity state is formed. Or, the first to third operation units 27, 13, 16 may provide a command to an actuator to form the continuity state.

A timer which counts time that passes from when the first opening/closing unit 3 is closed until a current starts to flow through the second electric component 14, or another protecting device may be used as the above protecting device. For example, the protecting device may be configured to cease the electric power supply to the second electric component 14, when the integrated value of the current that flowed through the second electric component 14 from a time point when the first opening/closing unit 3 is closed exceeds a predetermined value, or a battery voltage reaches a predetermined SOC (state of charge) or less. Thus, the protecting device may be configured to cease the electric power supply to the second electric component 14, when the state which changes with time satisfies a predetermined condition. Also, the protecting device may be configured to increase the SOC of the battery by an electric generator under running of the engine when the battery voltage reaches the predetermined SOC or less.

As the second electric component 14, a device which is activated when the rider moves away from the vehicle body can be suitably used. For example, the second electric component 14 may be a device indicating the existence of the vehicle body, such as an alarm light or a hazard lamp, a theft prevention device, etc. The second electric component 14 is not limited to a device used in the stopped state of the vehicle 1, and may be used during driving and during the stopped state. It is sufficient that the second opening/closing unit 12 is connected in series with the contact element 18a and placed on the second wire 5 in a position in which the electric potential is higher than the connection position (low potential position) 19b at which the connection line 19 is connected to the second wire 5.

In a case where each of the first wire 4 and the second wire 5 is configured to be separable into a high potential side and a low potential side, the second operation unit 13 is preferably removably attached to another switch attached to the vehicle body. In this configuration, when a power supply circuit relating to the second electric component 14 is unnecessary, the second operation unit 13 may be detached from the vehicle body. As a result, the components can be reduced.

The second wire 5 may be configured to be separable into the high potential side and the low potential side, by the terminals 22, 32. In this case, it is sufficient that the fourth wire 8 is configured to branch from the second wire 5 in a position in which the electric potential is higher than that in the connection position (high potential position) 19a at which the connection line 19 is connected to the second wire 5 and is lower than that in the first opening/closing unit 3. In this case, the first electric component 7 is connected in series with the first opening/closing unit 3 and connected in parallel with the electromagnetic coil 18b.

The first operation unit 27 is preferably operated by the rider and configured so that a person which is other than the rider has difficulty in the operation of the first operation unit 27. In an alternative example of the configuration of the present embodiment, the first operation unit 27 may be operated according to the operation procedure preset by the rider. For example, the operation of the first operation unit 27 may be permitted when a password is input or a procedure set by the rider is executed.

Although in the above described embodiments, the first electric component 7 is placed in the position in which the electric potential is lower than that in the first opening/closing unit 3, it is sufficient that the first electric component 7 is configured to be supplied with the electric power when the first opening/closing unit 3 is closed. In other words, the first electric component 7 may be placed in the position in which the electric potential is higher than that in the first opening/closing unit 3. In this case, it is sufficient that the electromagnetic coil 18b may be placed in the position in which the electric potential is lower than that in the first opening/closing unit 3 such that a current flows through the electromagnetic coil 18b when the first opening/closing unit 3 is closed.

The above configuration may be applied to the electric vehicle as well as the vehicle including the engine. Although the configuration is suitable for use with the vehicle in which the operation units operated by the rider are exposed outside, such as the motorcycle, it may be applied to, for example, a four-wheeled vehicle in which the operation units are covered with a body. The configuration is not limited to the above so long as the retaining device receives as inputs the commands from the two operation units and outputs the command indicating whether or not to perform the electric power supply to the second electric component 14.

As should be appreciated from the foregoing directions, the vehicle and the electric power supply control device thereof of the present invention are effectively applied to vehicles such as a straddle-type vehicle including a motorcycle, personal watercraft (PWC), an automated three-wheeled vehicle, an open car, a buggy car, an all-terrain vehicle (ATV), a ship (board), etc.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. A vehicle comprising:
    a first wire which connects a positive electrode of an electric power supply unit to a grounding location;
    a second wire which is connected in parallel with the first wire and connects the positive electrode of the electric power supply unit to the grounding location;
    a branching wire which branches from the first wire;
    a first electric component used for driving of the vehicle, the branching wire being provided with the first electric component;
    a first operation unit which is operated by a rider to perform switching between a first electric power supply state in which an electric power is supplied to the first electric component and a first electric power cut-off state in which the electric power is not supplied to the first electric component;
    a first opening/closing unit which is opened or closed by the first operation unit, the first wire being provided with the first opening/closing unit;
    a second operation unit which is operated by the rider to perform switching between a second electric power supply state in which the electric power is supplied to a second electric component which can be used in at least a stopped state of the vehicle and a second electric power cut-off state in which the electric power is not supplied to the second electric component;
    a second opening/closing unit which is opened or closed by the second operation unit and connected in parallel with the first opening/closing unit, the second wire being provided with the second opening/closing unit;
    a retaining device which starts electric power supply to the second electric component in response to a command output by operating the first operation unit to form the first electric power supply state and a command output by operating the second operation unit to form the second electric power supply state, and retains the electric power supply to the second electric component, until the second operation unit is operated to form the second electric power cut-off state, despite the rider's operation of the first operation unit to form the first electric power cut-off state, after the retaining device started the electric power supply to the second electric component;
    a first terminal connected in series with the first opening/closing unit, the first wire being provided with the first terminal; and
    a second terminal connected in parallel with the first opening/closing unit, the second wire being provided with the second terminal,
    wherein a first circuit including the first opening/closing unit, the first electric component, the first terminal and the second terminal being provided in a first harness module,
    wherein a second circuit including the second electric component, the retaining device, and the second opening/closing unit is provided in a second harness module which is removably electrically connected to the first terminal and the second terminal of the first harness module, and
    wherein the branching wire branches from the first wire in a position having an electric potential which is lower than that of the first opening/closing unit and higher than that of the first terminal.

2. The vehicle according to claim 1,
    wherein the first operation unit is operated via a portable member.

3. The vehicle according to claim 1,
    wherein the retaining device includes an activation section which is operative in response to an activation command; and an opening/closing section which is activated by the activation section and connected in series with the second electric component,
    wherein the activation section receives the activation command in either one of a first state in which the first operation unit is operated to form the first electric power supply state and a second state in which the activation section operates and the second operation unit is operated to form the second electric power supply state, and
    wherein the activation section closes the opening/closing section in response to the activation command, and opens the opening/closing section, in a state in which the activation command is not provided to the activation section.

4. The vehicle according to claim 3,
    wherein the first opening/closing unit is connected in series with the first electric component,
    wherein the second opening/closing unit is connected in series with the second electric component, and
    wherein the first opening/closing unit and the second opening/closing unit are connected in parallel in an electric circuit via which the electric power is supplied from the electric power supply unit to the first electric component and the second electric component.

5. The vehicle according to claim 4,
wherein the activation section is an electromagnetic coil connected in series with the first opening/closing unit,
wherein the opening/closing section is a contact element which is connected in series with the second opening/closing unit and shifted from an open state to a closed state by excitation of the electromagnetic coil,
wherein the retaining device further includes a connection line electrically connecting to each other a first wire on which the electromagnetic coil is provided and a second wire on which the contact element is provided,
wherein the electromagnetic coil is excited in response to the activation command which is a current supplied to the electromagnetic coil through the connection line,
wherein the connection line electrically connects to each other a high potential position of the first wire in which electric potential is higher than that in a position of the first wire on which the electromagnetic coil is provided and a low potential position of the second wire in which the electric potential is lower than that in a position of the second wire on which the contact element is provided and a position of the second wire on which the second opening/closing unit is provided, and
wherein the contact element moves to an electric power supply position in a state in which the electromagnetic coil is excited and move to an electric power cut-off position in a state in which the electromagnetic coil is unexcited.

6. The vehicle according to claim 5, further comprising:
a first diode which prevents a current from flowing through the first wire in a direction from the high potential position toward the first opening/closing unit; and
a second diode which prevents the current from flowing through the connection line in a direction from the first wire toward the second wire.

7. The vehicle according to claim 3 further comprising:
a third operation unit which is operated by the rider to perform switching between a third electric power supply state in which the electric power is supplied to a third electric component which can be used in at least the stopped state of the vehicle and a third electric power cut-off state in which the electric power is not supplied to the third electric component; and
a third opening/closing unit which is opened or closed by the third operation unit and connected in parallel with the second opening/closing unit in a position in which the electric potential is lower than that in the retaining device,
wherein the vehicle is configured such that the activation command is not provided to the activation section in a state in which the first opening/closing unit and the second opening/closing unit are opened.

8. The vehicle according to claim 1,
wherein the vehicle is a straddle-type vehicle.

9. An electric power supply device of a vehicle, the electric power supply device including a first operation unit which is operated by a rider to perform switching between a first electric power supply state in which an electric power is supplied to a first electric component used for driving of the vehicle and a first electric power cut-off state in which the electric power is not supplied to the first electric component, the electric power supply device comprising:
a first wire which connects a positive electrode of an electric power supply unit to a grounding location;
a second wire which is connected in parallel with the first wire and connects the positive electrode of the electric power supply unit to the grounding location;
a branching wire which branches from the first wire;
a first opening/closing unit which is opened or closed by the first operation unit, the first wire being provided with the first opening/closing unit;
a second operation unit which is operated by the rider to perform switching between a second electric power supply state in which the electric power is supplied to a second electric component which can be used in at least a stopped state of the vehicle and a second electric power cut-off state in which the electric power is not supplied to the second electric component;
a second opening/closing unit which is opened or closed by the second operation unit and connected in parallel with the first opening/closing unit, the second wire being provided with the second opening/closing unit;
a retaining device which starts electric power supply to the second electric component in response to a command output by operating the first operation unit to form the first electric power supply state and a command output by operating the second operation unit to form the second electric power supply state, and retains the second electric power supply to the second electric component, until the second operation unit is operated to form the second electric power cut-off state, despite the rider's operation of the first operation unit to form the first electric power cut-off state, after the retaining device has started the electric power supply to the second electric component;
a first terminal connected in series with the first opening/closing unit, the first wire being provided with the first terminal; and
a second terminal connected in parallel with the first opening/closing unit, the second wire being provided with the second terminal,
wherein a first circuit including the first opening/closing unit, the first electric component, the first terminal and the second terminal being provided in a first harness module,
wherein a second circuit including the second electric component, the retaining device, and the second opening/closing unit is provided in a second harness module which is removably electrically connected to the first terminal and the second terminal of the first harness module, and
wherein the branching wire branches from the first wire in a position having an electric potential which is lower than that of the first opening/closing unit and higher than that of the first terminal.

* * * * *